(12) United States Patent
Schmidt et al.

(10) Patent No.: US 6,352,310 B1
(45) Date of Patent: Mar. 5, 2002

(54) VEHICLE SEAT

(75) Inventors: Bernd Schmidt, Wildberg;
Ralf-Henning Schrom, Rottenburg, both of (DE); Philip C. Shephard, Birmingham (GB); Petros Velimvassakis, Karlsruhe (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/521,465

(22) Filed: Mar. 8, 2000

(30) Foreign Application Priority Data

Mar. 8, 1999 (DE) .......................................... 199 10 085

(51) Int. Cl.[7] .................................................. B60N 2/20
(52) U.S. Cl. .................................. 297/378.12; 297/378.1
(58) Field of Search ............................. 297/378.12, 336, 297/378.1

(56) References Cited

U.S. PATENT DOCUMENTS

| | | | | |
|---|---|---|---|---|
| 4,103,964 A | * | 8/1978 | Klingelhofer | .......... 297/378.12 |
| 5,240,309 A | * | 8/1993 | Kojer | .................... 297/378.12 |
| 5,611,600 A | * | 3/1997 | Busch et al. | ........ 297/378.12 X |
| 5,904,403 A | * | 5/1999 | Unckrich | ................ 297/378.12 |
| 5,938,286 A | * | 8/1999 | Jones et al. | ............. 297/378.12 |
| 6,131,999 A | * | 10/2000 | Piekny et al. | .......... 297/378.12 |

FOREIGN PATENT DOCUMENTS

DE          25 14 819          10/1976

* cited by examiner

Primary Examiner—Anthony D. Barfield
(74) Attorney, Agent, or Firm—Crowell & Moring LLP

(57) ABSTRACT

A vehicle seat has a backrest which can be tilted forward about a swivelling axis displaced toward the front with respect to the backrest into an alternate position for facilitating the entry and the exit. The backrest is fixed in its tilted-back end position by way of latching devices arranged on both sides on the seat cushion part, after which the latching devices can be synchronously unlocked in a remote-controlled manner by a common actuating element. For the swivel bearing and for the support of the backrest with respect to the seat cushion part, lateral support fittings are provided, on which, at a distance behind the forward swivelling axis, a hinge is arranged for adjusting the inclination of the backrest. The support fittings each have a rearward-projecting holding leg which ends at a distance behind the assigned hinge of the backrest, the free leg end of the holding leg in the tilted-back end position of the backrest being lockable on the seat cushion part.

15 Claims, 3 Drawing Sheets

VEHICLE SEAT

BACKGROUND AND SUMMARY OF THE INVENTION

This application claims the priority of German Patent Document 199.10 085.3, filed Mar. 8, 1999, the disclosure of which is expressly incorporated by reference herein.

The invention relates to a vehicle seat having a backrest which can be tilted forward into an alternate position for facilitating the entry and the exit of passengers. In preferred embodiments of the invention, the vehicle seat has a brackrest which can be titled forward about a swivelling axis displaced toward the front with respect to the backrest into an alternate position for facilitating the entry and the exit, the backrest being fixed in its tilted-back end position by way of latching devices arranged on both sides on a seat cushion part, after which the latching devices can be synchronously unlocked in a remote-controlled manner by a common actuating element, and, for the swivel bearing and for the support of the backrest with respect to the seat cushion part, lateral support fittings being provided, on which, at a distance behind the forward swivelling axis, a hinge is arranged for adjusting the inclination of the backrest.

A vehicle seat of this type known from German Patent Document DE 25 14 819 A1 has a holding bolt at a distance behind the swivelling axis on both sides on the seat cushion part. When the backrest is tilted back, a locking hook, which is assigned to the holding bolt, reaches behind the holding bolt, the locking hook being linked to the pertaining support fitting and being controlled with respect to its movements by means of a locking and unlocking mechanism. Since a considerable installation space is required for the locking and unlocking mechanism, the support fittings are designed in a correspondingly large size. Because of the related high weight of the support fittings and because of the resulting high arrangement of the hinge, which may impair the sitting comfort, this may be undesirable.

It is an object of the invention to further develop a vehicle seat having a backrest which can be tilted forward into an alternate position for facilitating the entry and exit such that, while the supporting function is reliable, its support fittings can have more favorable dimensions.

According to the invention, this object is achieved by means of a vehicle seat having a backrest which can be tilted forward about a swivelling axis displaced toward the front with respect to the backrest into an alternate position for facilitating the entry and the exit, the backrest being fixed in its tilted-back end position by way of latching devices arranged on both sides on a seat cushion part, after which the latching devices can be synchronously unlocked in a remote-controlled manner by a common actuating element, and, for the swivel bearing and for the support of the backrest with respect to the seat cushion part, lateral support fittings being provided, on which, at a distance behind the forward swivelling axis, a hinge is arranged for adjusting the inclination of the backrest, wherein the support fittings each have a rearward-projecting holding leg which ends at a distance behind the assigned hinge of the backrest, the free leg end of the holding leg in the tilted-back end position of the backrest being lockable on the seat cushion part.

Advantageous embodiments of the vehicle seat according to the invention with expedient further developments of the invention are described below and in the claims.

Since the vehicle seat is locked on rearward-projecting, free leg ends of its holding legs, the hinge of the backrest can be arranged with fewer problems in a lower position displaced with respect to the supporting points of the support fittings.

In addition, the free leg ends can be constructed as bolt-like locking devices, whereby the movable parts of the locking arrangement can advantageously be arranged on the seat cushion part. As a result, when the backrest is locked, more favorable lever conditions will occur on the support fittings and thus the suitability for integral seats will be improved, in the case of which also the belt forces occurring particularly in the event of front collisions of the vehicle must be absorbed by the backrest or by the support fittings.

A particularly favorable distribution of the forces exercised by way of the backrest on the support fittings is obtained if the respective supporting point is situated in the area of the holding arm at a distance behind the hinge.

The leg ends can be locked in a particularly effective and reliable manner by means of U-shaped bows which are rotatably disposed on the seat frame of the seat cushion part. It is understood that, as the result, the leg end of the assigned holding arm may also be thickened in an adaptation to the larger clear bow cross-section.

In order to permit, in the case of an integral seat, in a simple manner, an adaptation of the rotary latch stability to the loads onto the laterally arranged support fittings of the seat which differ in the event of collisions, the U-shaped bow has a wider construction on the side of the belt anchoring point than on the opposite side.

Other objects, advantages and novel features of the present invention will become apparent from the following detailed description of the invention when considered in conjunction with the accompanying drawings.

DETAILED DESCRIPTION OF THE DRAWINGS

Figure 1:
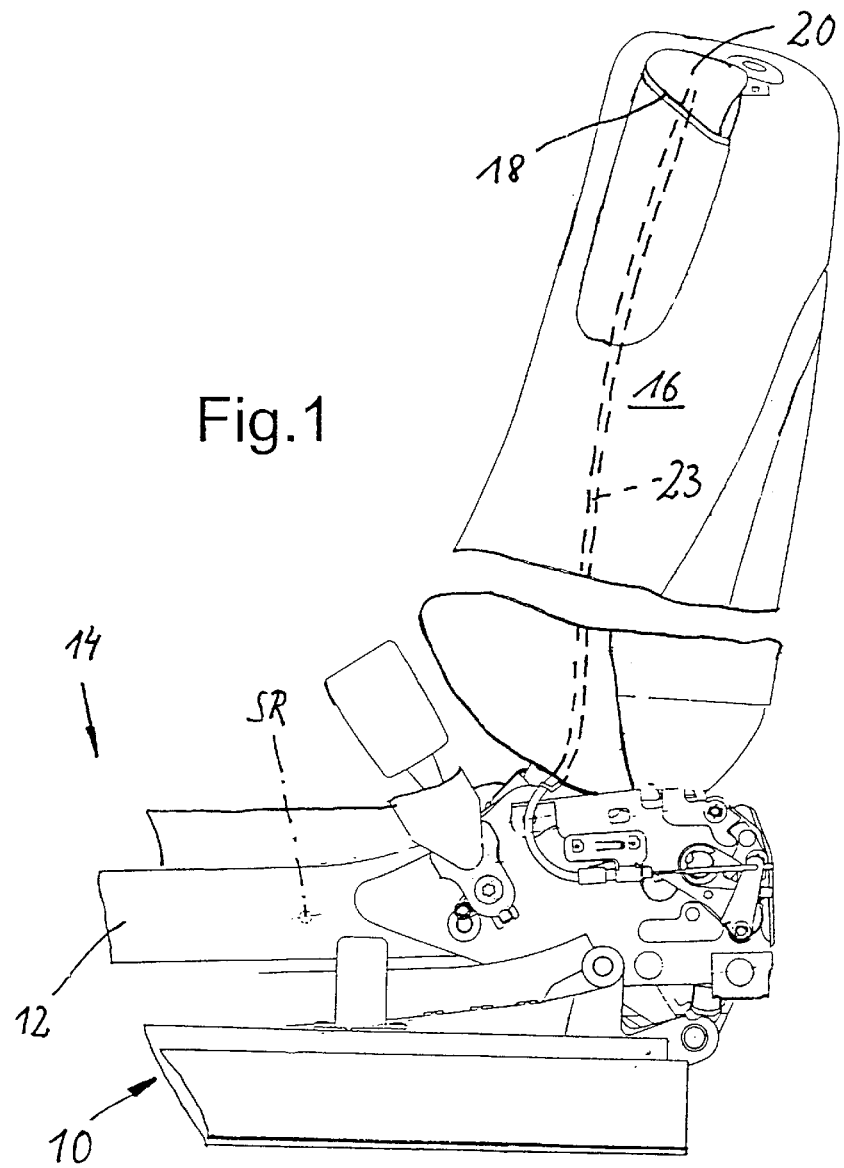
FIG. 1 is a lateral view of a seat frame of a vehicle seat with a backrest which can be tilted forward into an alternate position, constructed according to a preferred embodiment of the invention.

FIG. 1 is a lateral view of a longitudinally adjustable vehicle seat which is constructed as an integral seat with an integrated seat belt system and which comprises a seat frame 12 of a schematically outlined seat cushion part 14 vertically adjustably arranged above a seat underframe 10. On the seat frame 12 of the seat cushion part 14, a backrest 16 is arranged which can be tilted forward into an alternate position about a swivelling axis SR which is displaced toward the front with respect to the backrest 16, for facilitating the entry and exit. When the backrest 16 is tilted forward, a driving motor, which is not shown, of a longitudinal adjusting device is simultaneously activated by way of a microswitch and the vehicle seat is moved toward the front in a motor-driven manner. In the upper lateral area of the backrest 16, an upper belt anchoring point 18 is fastened through which the seat belt exits from the interior of the vehicle seat. Above the belt anchoring point 18, an actuating element 20 is arranged by means of which locking devices 22 (FIGS. 2a, 2b), which will be described below, can 20 be synchronously unlocked in a remote-controlled manner by way of a Bowden cable, after which the backrest 16 can be moved from the tilted-back into the tilted-forward alternate position.

Figures 2A, 2B:
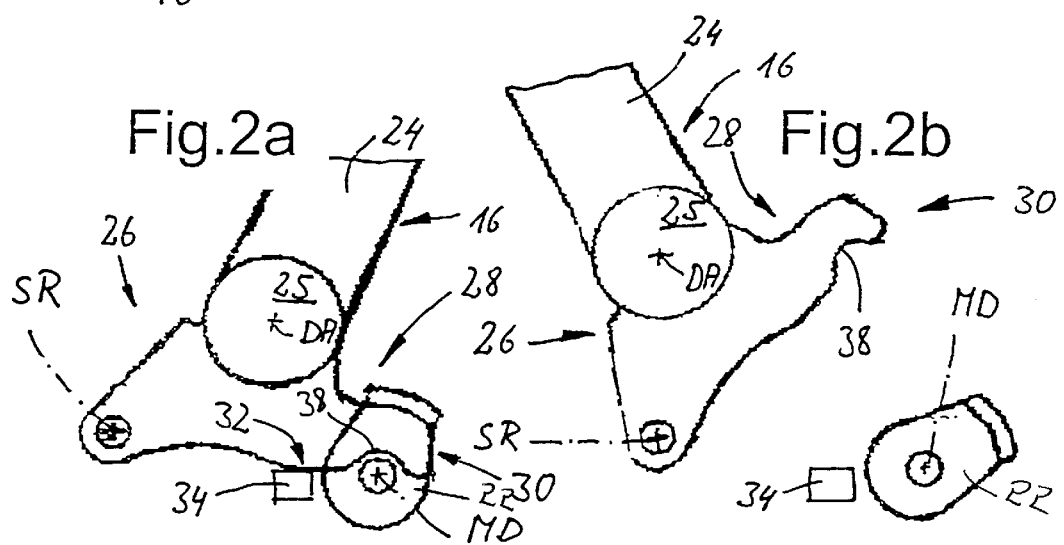
FIGS. 2a, b are schematic views respectively of a backrest frame of the backrest which, by way of lateral support fittings, is swivellably arranged on the seat frame of the seat cushion part.

FIGS. 2a and 2b respectively are schematic views of a backrest frame 24 of the backrest 16 which can be swivelled with its two support fittings 26 about the swivelling axis SR, the two support fittings 26 being disposed in the lateral lower area of the backrest 16 on the interior side on the seat frame 12 (FIG. 1) of the seat cushion part 14. In FIG. 2a, the backrest frame 24 with the support fittings 26 is in the tilted-back end position, and in FIG. 2b, it is in the tilted-forward alternate position. One hinge 25 respectively is arranged on the two support fittings 26 at a distance behind the forward swivelling axis SR of the backrest 16. The backrest frame 24 can be swivelled about the hinge axis DA and the inclination of the backrest 16 can therefore be adjusted. The support fittings 26 each have a rearward-projecting holding leg 28 which ends at a distance behind the assigned hinge 25 of the backrest 16. The holding legs 28 each have a free leg end 30 which, in the tilted-back end position of the backrest 16, by means of the latching devices 22, which can be unlocked in a remote-controlled manner by way of the actuating element 20, are fastened in a locked manner on the seat frame 12 of the seat cushion part 14. In the tilted-back end position, the support fittings 26 are supported by means of supporting points 32 on anvil-type parts 34 which are arranged on the seat frame 12 of the seat cushion part 14. The supporting points 32 are preferably situated at a distance behind the hinge 25 of the backrest 16. The connection lines between the swivelling axis SR, the free leg end 30 and the hinge axis DA of the respective support fitting 26 preferably form an approximate isosceles triangle.

Figure 3:
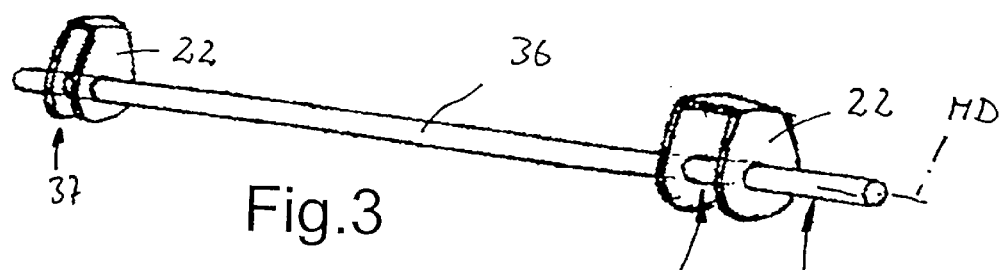
FIG. 3 is a schematic perspective view of two locking devices for locking the backrest in the tilted-back end position, the two rotary latches being rotationally coupled with one another by way of a connecting rod and being fastened to the seat frame.

As can be recognized in combination with FIG. 3, the latching devices 22 are constructed as approximately U-bow-shaped rotary latches which are rotatably coupled with one another by way of a connecting rod 36, the rotary latches 22 being swivellable about the center axis MD of the connecting rod 36, and the connecting rod 36 being rotatably disposed on the seat frame 12 of the seat cushion part 14. In the embodiment illustrated in FIG. 3, the connecting rod 36 also forms the latching axis 37 of the respective rotary latch 22. However, it would also be conceivable for the connecting rod 36 to extend concentrically with respect to the respective latching axis 37, in which case the whole latching element with the rotary latches 22 with their latching axes 37 and the connecting rod 36 arranged between the rotary latches 22 is then rotatable by way of the latching axis 37 disposed on the seat frame 12. FIG. 3 also shows that the rotary latch 22 has a strengthened construction on the side of the belt anchoring point 18 because, in the case of an integral seat, a particularly high force is applied onto the support fitting 26 on this side, for example, in the event of an accident.

In the locking position of the rotary latches 22 illustrated in FIG. 2a, these reach around the leg end 30 of the assigned holding leg 28, whereby the respectively assigned support fitting 26 is fixed in the front on the swivelling axis SR and in the rear by way of the rotary latch 22 on the seat frame 12. For the unlocking of the leg ends 30, the rotary latches 22—as illustrated in FIG. 2b—are rotated toward the rear clockwise about the axis MD. Accordingly, for the locking of the leg ends 30, they are moved toward the front counterclockwise. In the area of the latching axis 37 or of the connecting rod 36, the leg ends 30 of the holding legs 28 have an indentation 38. It would also be conceivable for the supporting points 32 of the support fittings 26 to be supported in the area of the indentations 38 on the latching axes 37 or on the connecting rod 36. In this case, no anvil-type parts 34 would have to be provided for supporting the support fittings 26 on the seat frame 12.

Figure 4A:
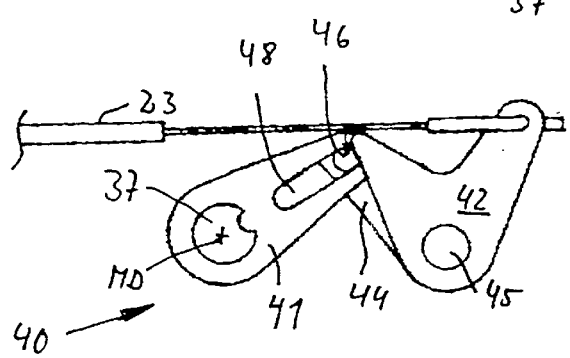
FIGS. 4a, b, c are respective schematic and a perspective (FIG. 4c) lateral view respectively of components of a control mechanism for securing and releasing the rotary latches in the locked position.
Figure 4B:
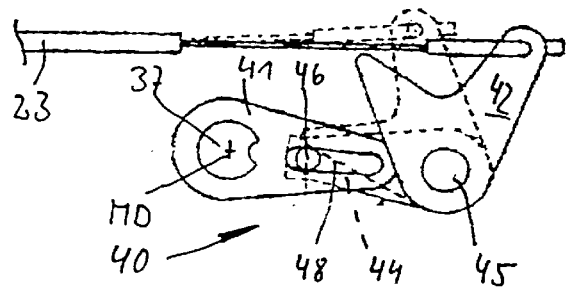
Figure 4C:
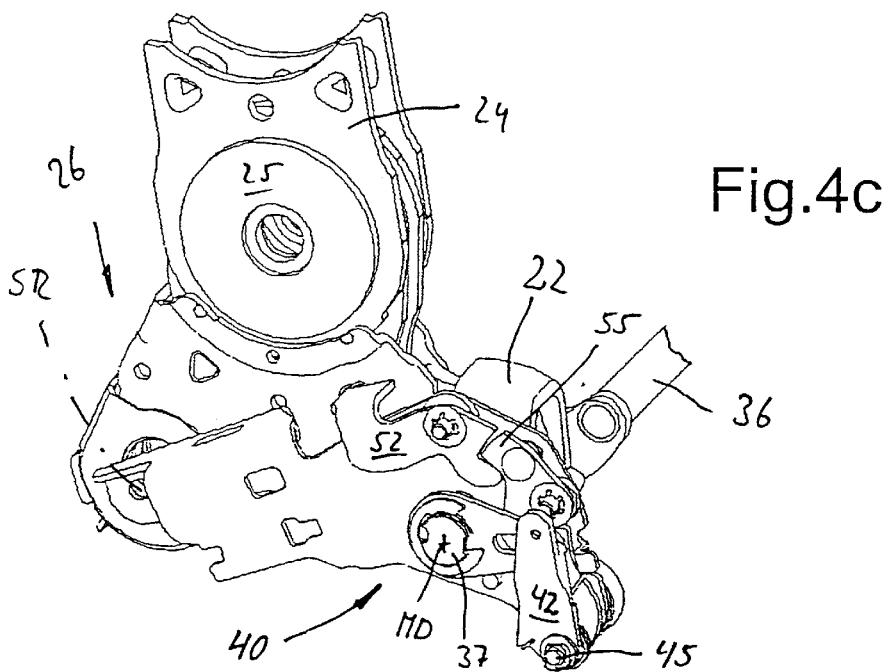

Components of a control mechanism 40 are illustrated in FIGS. 4a, 4b in a schematic lateral view and in FIG. 4c, in a perspective lateral view, which components are used for the securing and releasing of the rotary latches 22 in the locked position. The control mechanism 40 comprises a rotatably disposed connecting link arm 41 which—as illustrated particularly in FIG. 4c —, is non-rotatably arranged on one of the ends of the latching axis 37. At a distance from the latching axis 37, an approximately V-shaped draw lever 42 and a lever arm 44 are arranged behind one another and are disposed to be rotatable about a lever axis 45, a connecting link pin 46 projecting from the lever arm 44 engages in an oblong hole 48 of the connecting link arm 41. The V-shaped draw lever 42 and the lever arm 44 are not rotatably fixedly connected with one another. The Bowden cable 23 is fastened on the rearward arm of the V-shaped draw lever 42.

If the draw lever 42 is now triggered by way of the Bowden cable 23 by the actuating element 20 and is rotated clockwise against the spring force of a spiral spring, which is not shown, the draw lever 42, by means of its forward arm, during its swivelling movement toward the front, guides the connecting link pin 46 along, whereby the lever arm 44 and the draw lever 42 together are rotated together from the position illustrated in FIG. 4a into the position in FIG. 4b. As the result of the connecting link pin 46 guided in the oblong hole 48, the connecting link arm 41 is rotated clockwise. The rotary latches 22, which are non-rotatably connected with the connecting link arm 41 by way of the latching axis 37 or the connecting rod 36, are also rotated clockwise, whereby the two free leg ends 30 (FIG. 2b) are released for the tilting-forward of the backrest 16. The lever arm 44 is optionally held in the lower position illustrated in FIG. 4b by means of a securing mechanism 49 (FIGS. 5a, 5b, 6a, 6b) which will be explained below with reference to FIGS. 5a, b and 6a, b. Thus, when the actuating element 20 is released and the related swivelling-back of the draw lever 42 takes place clockwise, the lever arm 44 remains at its location. The same applies to the connecting link arm 41 with the rotary latches 22 which is coupled with the lever arm 44 with respect to its movement.

Figure 5A:
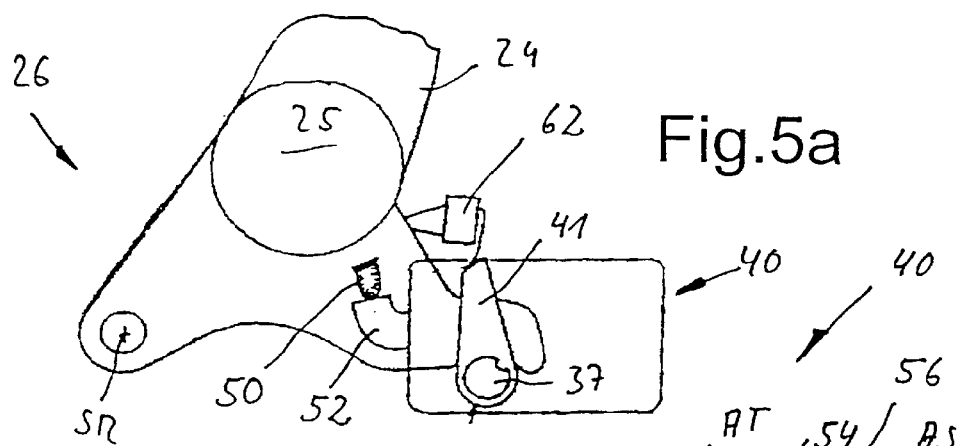
FIGS. 5a, b are respective schematic views of one of the support fittings with the control mechanism as well as an enlarged schematic view of a securing mechanism of the control mechanism when the backrest is tilted back.

A spring bolt 50 is arranged laterally on the support fitting 26 which is illustrated in its tilted-back end position in FIG. 5a. This spring bolt 50 is supported in this position of the backrest 16 on a key lever 52 of the securing mechanism 49, which key lever 52 can be swivelled about an axis AT (FIG.

5b). According to FIG. 5b, this key lever 52 engages with a securing lever 54 in a claw-type manner, which securing lever 54 can be swivelled about an axis AS and has a laterally projecting pin 56 which is arranged inside a larger bore 58 in a housing 60 of the control mechanism 40 and is limited in its movement influenced by the key lever 52. In the position of the support fitting 26 illustrated in FIGS. 5a and 5b when the backrest 16 is tilted back, the securing lever 54 is therefore brought by the key lever 52 into a position which is swivelled clockwise until the pin 56 rests against the rearward area 59 of the bore 58. A securing nose 55 of the securing lever 54 is correspondingly swivelled clockwise toward the front.

Figure 6A:
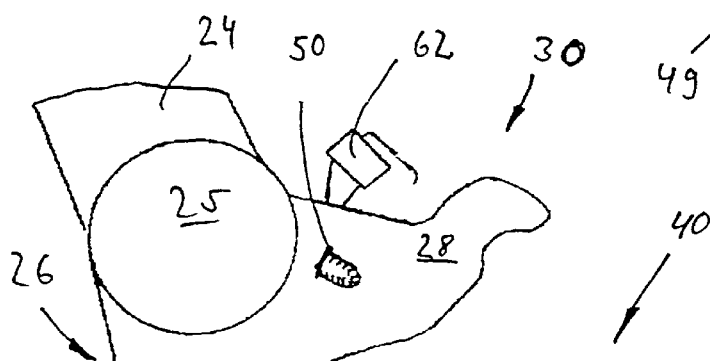
FIGS. 6a, b are a schematic view of one of the support fittings with the control mechanism as well as an enlarged schematic view of the securing mechanism when the backrest is tilted forward.
Figure 6B:
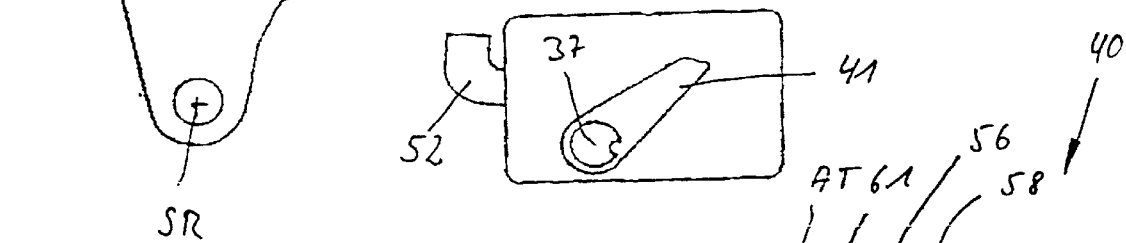
Figure 6B:
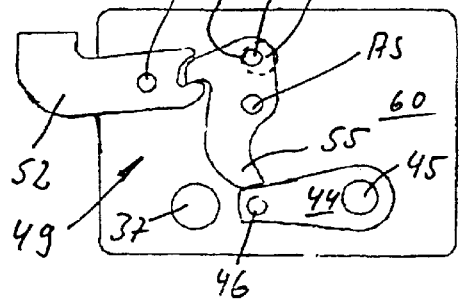

FIGS. 6a and 6b correspondingly show the securing mechanism 49 when the support fittings 26 are tilted forward, in which case the key lever 52 will then not be loaded by the spring bolt 50 and, as the result, the securing lever 54 is arranged in a position which is swivelled counterclockwise, the pin 56 then resting against the forward area 61 of the bore 58. The securing nose 55 of the securing lever 54 is correspondingly swivelled counterclockwise toward the rear.

Figure 5B:
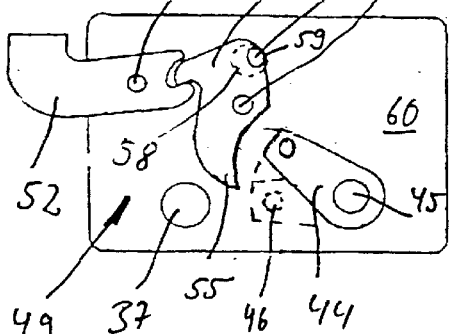

The securing mechanism 49 operates as follows:

The lever arm 44, which according to FIGS. 5b and 6b is arranged diagonally below the securing lever 54, together with the rotary latches 22, as explained in detail in conjunction with FIG. 4b, by means of the actuating of the draw lever 42 by means of the Bowden cable 23 or of the actuating element 20, is swivelled counterclockwise downward into the position illustrated in FIG. 4b. Accordingly, the backrest 16 can now be tilted forward, in which case the securing lever 54 is swivelled counterclockwise according to FIG. 6b and, as the result, the lever arm 44 situated in its lower position according to FIG. 4b is blocked by the securing nose 55. After the subsequent tilting-back of the backrest 16, the key lever 52 is loaded again by the impacting of the spring bolt 50, whereby the securing lever 54 with the securing nose 55 is swivelled clockwise and the lever arm 44 is released again, and whereby it is swivelled by means of a spring force again clockwise in the upward direction. Accordingly, the rotary latches 22 are swivelled again by way of the connecting link lever 41 (FIG. 4a) back into the locked position which fixes the backrest 16.

If—after the lever arm 44, together with the rotary latches 22, by means of the actuating of the draw lever 42 by means of the Bowden cable 23 and the actuating element 20 has been swivelled counterclockwise downward into the position indicated in FIG. 4b—the backrest 16 is not tilted forward, the securing lever 54, according to FIGS. 5a and 5b, remains in its forward position. Correspondingly, the lever arm 44 cannot be held by means of the securing nose 55 in its lower position and swivels back again together with the rotary latches 22 as soon as the draw lever 42 (FIG. 4a, b, c) is no longer actuated. In other words, in the case described here, the securing mechanism 49 provides that, after the actuating of the actuating element 20, the backrest 16 is locked again, if the backrest 16 was not tilted forward. On the whole, it can be ensured by means of the control mechanism 40 that the rotary latches 22 can lock only under their spring loading when the backrest 16 has reached its tilted-back end position.

The control mechanism 40 and the securing mechanism 49 form a mutually connected unit which is arranged on the seat frame 12. This unit is housed in the housing 60 which can be fitted in a particularly simple manner on the seat frame, for example, by means of a detent connection, in which case, the connecting link arm 41 must additionally be fitted onto the latching axis 37.

According to FIGS. 5a and 6a, a microswitch 62 is fastened on the support fitting 26. This microswitch 62 scans the locking position of the rotary latch 22 and is connected with a display in the center console which displays the locking condition of the backrest 16.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Vehicle seat having a backrest which can be tilted forward about a swivelling axis displaced toward the front with respect to the backrest into an alternate position for facilitating the entry and the exit, the backrest being fixed in its tilted-back end position by way of latching devices arranged on both sides on a seat cushion part, after which the latching devices can be synchronously unlocked in a remote-controlled manner by a common actuating element, and, for the swivel bearing and for the support of the backrest with respect to the seat cushion part, lateral support fittings being provided, on which, at a distance behind the forward swivelling axis, a hinge is arranged for adjusting the inclination of the backrest, wherein the support fittings each have a rearward-projecting holding leg which ends at a distance behind the assigned hinge of the backrest, a free leg end of the holding leg in the tilted-back end position of the backrest being lockable on the seat cushion part.

2. Vehicle seat according to claim 1, wherein a respective supporting point of the support fittings on the seat cushion part is situated at a distance behind the hinge for adjusting the inclination of the backrest.

3. Vehicle seat according to claim 1, wherein the connection lines between the swivelling axis the leg end and the hinge axis form approximately an isosceles triangle.

4. Vehicle seat according to claim 1, wherein the leg ends each interact with a rotary latch which is swivellably disposed on the seat cushion part.

5. Vehicle seat according to claim 4, wherein the rotary latches are constructed as U-shaped bows which, in their locking position, reach around the leg end of the assigned holding leg.

6. Vehicle seat according to claim 4, wherein the vehicle seat is an integral seat with an integrated seat belt system, and wherein the rotary latch is strengthened on the side of an upper belt anchoring point.

7. Vehicle seat according to claim 4, wherein the rotary latches are rotationally coupled by way of a connecting rod.

8. Vehicle seat according to claim 7, wherein the rotary latches are secured in their locked and unlocked position by way of a single control mechanism.

9. Vehicle seat according to claim 8, wherein the control mechanism acts upon the connecting rod.

10. Vehicle seat according to claim 8, wherein a stop device projects from the support fitting situated on the side of the control mechanism, by which stop device the control mechanism is held in the tilted-back position of the backrest in its triggered position.

11. Vehicle seat according to claim 4, wherein the rotary latches are swivellable by the actuating of a Bowden cable against a spring force into their unlocked position.

12. Vehicle seat according to claim 1, wherein the leg end has an indentation in the area of the latching axis.

13. Vehicle seat according to claim 1, wherein a display of the locking condition of the backrest is provided, the locking position being scanned by a microswitch.

14. Vehicle seat assembly comprising:

a seat cushion part a backrest part pivotally connected at a forward swiveling axis with the seat cushion part, to thereby permit forward tilting of the backrest part to accommodate passenger exit and entry with respect to a passenger space, and lateral support fittings carried by the backrest part, said lateral support fittings having hinge parts at a distance behind the forward swiveling axis for accommodating inclination of the backrest part about a backrest part hinge axis with respect to the seat cushion part, wherein the lateral support fittings each have a rearward projecting holding leg which ends behind the hinge parts, free leg ends of the respective holding legs being lockable on the seat cushion part by a respective latching device at a position behind the backrest part hinge axis when the backrest part is in a tilted back normal in use driving position.

15. Vehicle seat assembly according to claim 14, comprising means for synchronously unlocking the latching devices to accommodate forward tilting of the back rest about the swiveling axis.

* * * * *